United States Patent [19]

Nute, Jr.

[11] 4,011,707
[45] Mar. 15, 1977

[54] CROSS TEE END JOINT FOR SUSPENDED CEILING SYSTEM

[75] Inventor: Ernest B. Nute, Jr., Mountville, Pa.

[73] Assignee: Armstrong Cork Company, Lancaster, Pa.

[22] Filed: July 2, 1975

[21] Appl. No.: 592,557

[52] U.S. Cl. .............................. 52/664; 403/244; 403/231
[51] Int. Cl.² ............................................ F16B 7/22
[58] Field of Search ......... 403/231, 244, 245, 246, 403/346, 347; 52/758 A, 664, 645

[56] References Cited
UNITED STATES PATENTS

| | | | |
|---|---|---|---|
| 2,896,752 | 7/1959 | Wilde | 52/758 A |
| 2,990,921 | 7/1961 | Wilde | 52/758 A |
| 3,169,614 | 2/1965 | McCoy | 52/758 A |
| 3,270,479 | 9/1966 | Weinar | 52/664 X |
| 3,374,596 | 3/1968 | O'Brien et al. | 52/758 A |
| 3,722,933 | 3/1973 | Nute | 52/758 A |

Primary Examiner—Wayne L. Shedd

[57] ABSTRACT

An end detail is provided for a cross tee to provide positive engagement of the cross tee with the main runner of a suspended ceiling system. The end detail of the cross tee may be provided with means which will positively lock the tee in place to bracket-like structures on the main runner. The positive locking, yet removable, fastening means is provided to fasten the cross tee to the main runner of a suspended ceiling system.

2 Claims, 8 Drawing Figures

CROSS TEE END JOINT FOR SUSPENDED CEILING SYSTEM

BACKGROUND OF THE INVENTION

1. Field of the Invention

The invention is directed to a suspended ceiling grid construction and, more particularly, to the end detail structure of a cross tee and its cooperating structure on the main runner of a suspended ceiling system.

2. Description of the Prior Art

For many years, suspended ceiling systems were put together with a grid structure that had the main runner elements and cross tee elements permanently affixed together. In recent years, there have been many developments towards the use of ceiling systems with grid members which can be readily snapped together and then disassembled in toto, if desired, at a later date. Finally, a ceiling system was developed wherein one could remove any cross tee without damage at any point within the ceiling and subsequently replace the same cross tee.

U.S. Pat. No. 3,169,614 is typical of the current commercial suspended ceiling grid structures as last above described. The cross tee 13 is provided with a tongue 24 which engages two tabs 31. A locking dimple 34 is used to position the tongue in position relative the holding tabs 31. The problem encountered with this system is that the locking dimple 34 does not provide for a positive alignment of the cross tees relative each other. If an installer is not careful, the tongue will not be correctly engaged on the locking dimple 34 and the tees will show a wavey line structure when a number of them are viewed across a ceiling system.

U.S. Pat. No. 2,990,921 is directed to a connecting joint for a cross tee and main runner wherein alignment may be secured between a plurality of cross tees. Tongues 10 on the cross tee engage ears 4 on a main runner structure. The attaching structure is made as an element separate from the main body of the cross runner structure.

U.S. Pat. No. 2,896,752 is directed to a structure similar to that of the aforementioned patent except that a single tab is utilized to engage a single ear 10 on the main runner structure so as to lock the cross tee in position relative the main runner structure.

The invention herein is designed to provide the simplicity of structure such as that found in U.S. Pat. No. 3,169,614, while at the same time providing the positive alignment between a number of cross tees such as one would find in the above-mentioned other two U.S. patents.

SUMMARY OF THE INVENTION

The invention is primarily directed to a cross tee end detail for a lay-in grid system which is utilized to fasten the cross tee to the main runner of a suspended ceiling system. The end detail of the cross tee is provided with an extension structure which is utilized to positively lock the cross tee to an appropriate lance and bracket structure on a main runner structure. Two embodiments of the invention are shown. In both cases, the main runner is provided with a bracket and locking protrusion or lance. The cross tee end detail is varied in the two embodiments. In the one embodiment, the cross tee end detail is basically an extension member that rests on a bracket structure while in the other embodiment, the cross tee end detail is provided with a tongue structure which is inserted into a pocket on the main runner structure.

The invention herein provides a positive locking structure for fastening a cross tee to a main runner. The positive locking structure prevents the possibility of any misalignment between the different grid members forming the suspended ceiling system.

DESCRIPTION OF THE PREFERRED EMBODIMENTS

Figure 1:
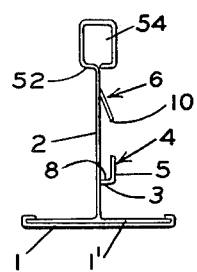
FIG. 1 is an end view of a main runner structure containing a portion of the locking mechanism herein.
Figure 2:
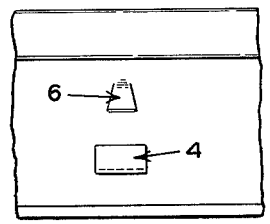
FIG. 2 is a side view of a main runner structure such as that shown in FIG. 1.

The first embodiment of the invention is shown in FIGS. 1–4 of the drawing. FIGS. 1 and 2 show the structure which is provided on the main runner. A bracket 4 is provided on the vertical web 2 of the main runner structure which further has oppositely disposed flanges 1 and 1' for the purpose of supporting ceiling tiles and panels. This bracket would simply be folded out from the material forming the vertical web. Above the bracket 4 there is provided a lance 6 which is also pushed out from the material forming the vertical web of the main runner structure. The distance from the inside 8 of the bottom of the bracket 4 to the lower edge 10 of the lance is slightly less than the critical width of the tongue structure of the cross tee. The bracket 4 has a base 3 and an upright extension 5. The extension 5 is spaced from the vertical web 2 a distance equal to the thickness of the tongue structure.

Figure 3:
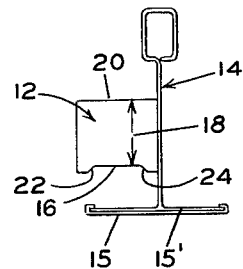
FIG. 3 is an end view of a cross tee structure which is meant to engage the structure of FIGS. 1 and 2.

FIG. 3 is an end view of a cross tee showing the tongue structure 12 provided thereon. The tongue structure is nothing more than an extension of the vertical web 14 of the cross tee and the tongue 12 extends at a right angle to the plane of the vertical web 14. Oppositely disposed flanges 15 and 15' will support ceiling panels. The tongue 12 is formed with a notch 16 on the bottom surface thereof and the distance from the top of the notch 16 to the top of the tongue, which is shown as distance 18, is the above referred to critical width of the tongue structure. This means that the top of the notch 16 will sit on the bottom 8 of the bracket 4 and the upper edge 20 of the tongue 12 will slide under the lance 6 on the main runner structure. The width of the slot 16, particularly at the top of the slot 16, is approximately equal to the width of the bracket 4. Therefore, the edges 22 and 24, on either side of the slot 16, will lock the tongue 12 in position relative the bracket 4 so that there will be no movement of the tongue 12 along the plane of the vertical web 2 of the main runner structure. The bracket 4 and lance 6 will lock the tongue 12 in position so that there is no up and down movement of the tongue 12 relative the plane of the vertical web of the main runner structure. Finally, bracket 4 and lance 6 lock the cross tee relative the main runner so that these elements do not readily separate.

Figure 4:
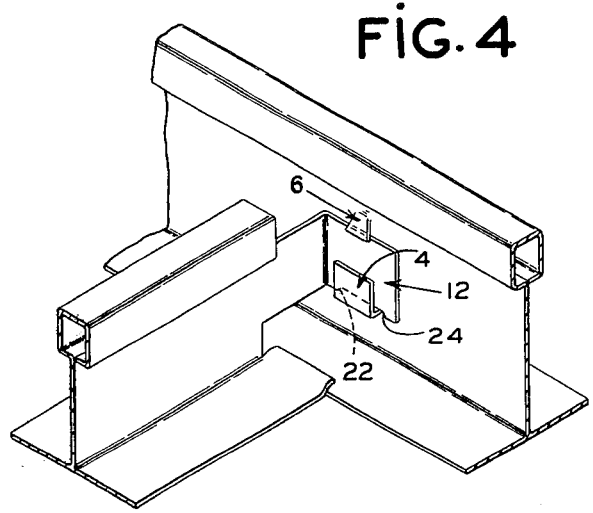
FIG. 4 is a perspective view of the assembled structure of FIGS. 1, 2 and 3.

FIG. 4 is a perspective view showing the assembled cross tee and main runner structure. Viewing this system, it will be seen how the lance 6 extends slightly down over top of the top edge of the tongue 12 while the tongue itself is being held in the bracket 4. It can also be seen how the sides 22 and 24 prevent the tongue from moving relative the lance 6 and bracket 4. The above structure is very similar to that shown in U.S. Pat. No. 3,169,614 and would be utilized in the same basic ceiling grid structure as disclosed in that patent except that the actual connecting joint for the structure herein is different from that shown in the above-mentioned patent so that there is now provided a more positive engagement of the cross tee with the main runner and that there is no opportunity for the cross tee and main runner to be positioned relative to each other with any degree of variance such as would provide the misalignment of a series of cross tees extending in a single row fastened to a plurality of parallel main runner structures.

Figure 5:
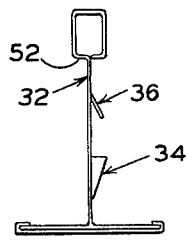
FIG. 5 is a modification of the structure of FIG. 1 and is an end view of a main runner structure containing a portion of the locking mechanism herein.
Figure 6:
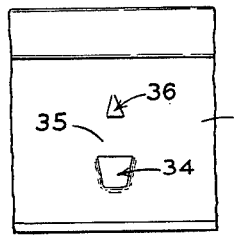
FIG. 6 is a modification of the structure of FIG. 2 and is a side view of a main runner structure such as that shown in FIG. 5.

FIGS. 5–8 are directed to a modification of the structure disclosed in FIGS. 1–4. FIGS. 5 and 6 are a showing of the structure which will be placed upon the vertical web 32 of the main runner structure. The lance 36 will be the same as the lance 6 of the embodiment of FIGS. 1 and 2. The bracket 4 of the embodiment of FIGS. 1 and 2 will be replaced by a pocket 34. This pocket 34 will be pushed out from the metal forming the vertical web 32. However, the pocket 34 will still be fastened on three sides to the vertical web 34 and only the upper part 35 of the pocket 34 will be separated from the metal of the vertical web 34. This then forms a pocket which is similar to the pocket of a pair of pants.

Figure 7:
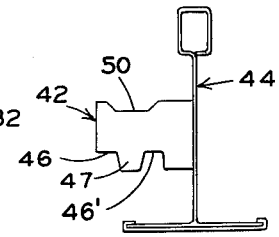
FIG. 7 is a modification of the structure of FIG. 3 and is an end view of a cross tee structure which is meant to engage the structure of FIGS. 5 and 6.

In FIG. 7 there is provided the modified form for the tongue 42 of the vertical web 44 of the cross tee. The tongue will be very similar to the structure of FIG. 3 except that the bottom of the tongue will be provided with two cut outs 46 and 46' so as to form a protrusion 47. This protrusion 47 is sized to fit within the pocket 34 with the lower end of the protrusion extending down into the opening 35 of the pocket 34. Once the protrusion 47 is fully inserted into the pocket 34, the upper edge 50 of the tongue 42 will now snap past the lance 36 so that the tongue 42 is now positively held between the pocket 34 and lance 36. In addition, the protrusion 47 is inserted into pocket 34 and this tends to positively lock the assembly together. Due to the insertion of protrusion 47 into pocket 34, it is now not possible to move the tongue structure in a back and forth direction relative to the plane of the vertical web 32 of the main runner structure. Due to the existence of the pocket 34 and the lance 36, it is not possible to move the tongue structure up and down relative the plane of the vertical web 32 of the main runner structure.

Figure 8:
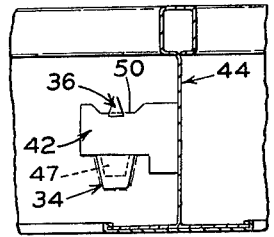
FIG. 8 is a modification of the structure of FIG. 4 and is a perspective view of the assembled structure of FIGS. 5, 6 and 7.

FIG. 8 is a showing of the structures of FIGS. 5 through 7 in an assembled form. The tongue 42 of the cross tee is in position relative the vertical web 32 of the main runner. The protrusion 47 of the tongue 42 of the cross tee is inserted into the pocket 34. The upper edge 50 of the tongue has passed beyond and is under the lance 36. The existence of the pocket 34 and the lance 36 now will prevent the tongue of the cross tee from moving up and down relative the main runner structure. In addition, the protrusion 47 being inserted into the pocket 34 will prevent the tongue assembly from moving in a sideward direction relative the main runner structure. There is now provided a structure which has positively locked together the tongue of the cross tee and the vertical web of the main runner structure.

Under some circumstances, one may eliminate the lance 6 or 36 and use the edge 52 of the bulb 54 of a conventional main runner as the means to engage the top of the tongue means to hold the tongue means in position. The bracket 4 and pocket 34 may be used to position the oppositely disposed flanges of the main runner and cross tee in the same plane or closely adjacent parallel planes. However, other means may be used to secure this relationship between the main runner and cross tee flanges (1 and 15) while bracket 4 and pocket 34 function only as a means to fasten the main runner and cross tee together with no movement of the cross tee back and forth along the longitudinal axis of the web of the main runner.

What is claimed is:

1. A suspended ceiling grid structure adapted to support ceiling panels and the like, comprising:
   a. a main runner having a vertical web and oppositely disposed flanges,
   b. a cross tee having a vertical web and oppositely disposed flanges, a locking tongue means extending from at least one end of said cross tee,
   c. said locking tongue means extending generally perpendicular from the plane of the vertical web of the cross tee and being parallel with and adjacent with the vertical web of the main runner when the cross tee and main runner are properly positioned relative to each other,
   d. said vertical web of said main runner having a means engaging the bottom of said tongue means to hold said tongue means adjacent said vertical web of said main runner and restraining said tongue means from movement back and forth along the longitudinal axis of said vertical web of said main runner and restraining said cross tee fixedly in position relative said main runner, said means engaging the bottom of said tongue means is a bracket means engaging the bottom of said tongue means and said bracket means extends from the vertical web of the main runner structure and has an extension which extends parallel with the plane of said tongue means to hold said tongue means adjacent said vertical web of said main runner and to hold said cross tee and main runner in a fixed position, said tongue means has a notch forming shoulders on the bottom edge thereof which engage the sides of the bracket means to restrain the tongue means from movement along the longitudinal axis of said vertical web of said main runner, and
   e. said vertical web of said main runner further having a means which engages the top of said tongue means to restrain said tongue means from movement upward to prevent said tongue means from disengagement from said means engaging the bottom of said tongue means, said means engaging the top of said tongue means being a lance extending from the vertical web of said main runner.

2. A suspended ceiling grid structure adapted to support ceiling panels and the like, comprising:
   a. a main runner having a vertical web and oppositely disposed flanges,
   b. a cross tee having a vertical web and oppositely disposed flanges, a locking tongue means extending from at least one end of said cross tee,
   c. said locking tongue means extending generally perpendicular from the plane of the vertical web of the cross tee and being parallel with and adjacent with the vertical web of the main runner when the cross tee and main runner are properly positioned relative to each other,
   d. said vertical web of said main runner having a means engaging the bottom of said tongue means to hold said tongue means adjacent said vertical web of said main runner and restraining said tongue means from movement back and forth along the longitudinal axis of said vertical web of said main runner and restraining said cross tee fixedly in position relative to said main runner, said means for restraining said tongue means relative to the vertical web of the main runner being a pocket in said vertical web and said tongue means has a protrusion extending from the bottom edge of said tongue means and said protrusion engages said pocket to fixedly position said cross tee relative said main runner and to restrain the tongue means from movement along the longitudinal axis of said vertical web of said main runner, and
   e. said vertical web of said main runner further having a means which engages the top of said tongue means to restrain said tongue means from movement upward to prevent said tongue means from disengagement from said means engaging the bottom of said tongue means, said means engaging the top of said tongue means being a lance extending from the vertical web of said main runner.

* * * * *